(No Model.)
J. FLOOD & J. KIPLING.
APPARATUS FOR GENERATING ACETYLENE GAS.
No. 601,791. Patented Apr. 5, 1898.
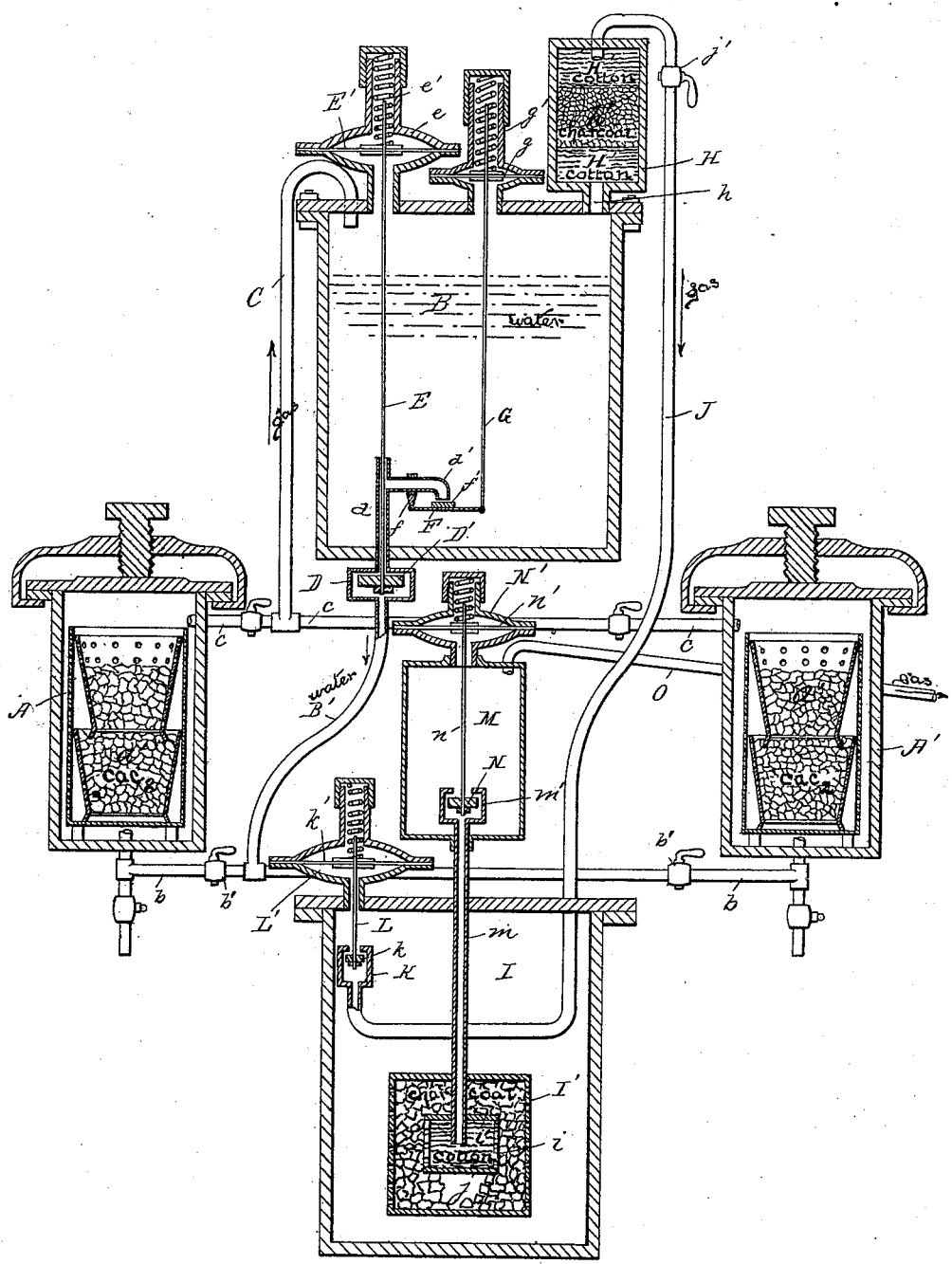
Witnesses
A. Page
Arthur Josselin
John Flood and Joseph Kipling, Inventors
By Attorney J. A. Marion

UNITED STATES PATENT OFFICE.

JOHN FLOOD AND JOSEPH KIPLING, OF QUEBEC, CANADA.

APPARATUS FOR GENERATING ACETYLENE GAS.

SPECIFICATION forming part of Letters Patent No. 601,791, dated April 5, 1898.

Application filed April 15, 1897. Serial No. 632,271. (No model.)

*To all whom it may concern:*

Be it known that we, JOHN FLOOD and JOSEPH KIPLING, citizens of the Dominion of Canada, residing at Quebec, in the Province of Quebec, Canada, have invented certain new and useful Improvements in Apparatus for Generating Acetylene Gas; and we do hereby declare the following to be a full, clear, and exact description of the invention, such as will enable others skilled in the art to which it appertains to make and use the same.

This invention relates to generators for acetylene gas; and it consists in the novel construction and combination of the parts hereinafter fully described and claimed.

The drawing shows a sectional diagrammatic view of the apparatus.

A A' are closed vessels in which are placed perforated receptacles a' for holding carbid of calcium or other similar metallic carbid from which acetylene gas may be generated.

B is a closed vessel containing water in its lower part and gas in its upper part. A pipe B' is adapted to let the water out of the vessel B, and b are branches provided with valves b', which connect the pipe B' with the lower parts of the vessels A and A', respectively.

C is a pipe for conducting the gas into the upper part of the vessel B, and c are branch pipes connecting the pipe C with the upper parts of the vessels A and A', respectively.

The generation of gas is arranged to take place alternately in the vessels A and A' by closing the valves in the branch pipes. In this manner the production of gas is constant, and one vessel can be recharged with carbid while the other is in action.

The pipe B' has a valve-chamber D and an extension d inside the vessel B. The extension d has a branch d', through which the water enters it.

D' is a valve in the chamber D, and E is a rod which couples the valve D' to a flexible plate E', of india-rubber, inside a casing e at the top of the vessel B. A spring e' is arranged over the plate E to prevent it from rising too freely.

F is a lever pivoted to a lug f on the branch d' and provided with a valve f' for closing the mouth of the said branch. G is a rod which connects the free end of the lever F with a spring-pressed plate g, of flexible material, inside a casing g' at the top of the vessel B.

H is a gas-filter arranged at the top of the vessel B, and h is an opening at its lower part connecting it with the said vessel.

The filter H is provided with two layers of absorbent cotton H' and a layer of charcoal h', interposed between the said layers of cotton.

I is a second gas-filter, and I' is a perforated vessel inside the said filter I. A second perforated vessel i is arranged inside the vessel I'. The vessel i is filled with absorbent cotton i', and the space between the two vessels I' and i is packed with charcoal j.

J is a pipe connected to the upper part of the filter H and provided with a regulating-valve j'. The pipe J passes into the second filter I and is provided with a valve-chamber K at its end. A valve k is arranged in the chamber K.

L is a spindle suspending the valve k from a plate k', of flexible material, provided with a spring at its upper side and inclosed within a chamber L', which is connected to the top of the filter I.

M is a gas-receiver, and m is a pipe connected to the perforated vessel i and projecting within the receiver M. The upper end portion of the pipe m is provided with a valve-chamber m'.

N is a valve inside the chamber m', and n is a spindle which suspends the valve N from a spring-pressed plate of flexible material n' inside a chamber N' at the top of the receiver.

O is a distributing-pipe for the gas, connected to the said receiver.

The gas is formed in the vessels A and A' and passes thence into the upper part of the vessel B. When the pressure of gas in the vessel B exceeds a prearranged limit, it closes the valves by pressing upward on the plates of flexible material. The supply of water being cut off by the closing of the valves, no more gas is generated in the vessels A and A' until the pressure falls.

The gas is purified by passing it through the filters, and its pressure is reduced by the action of the automatic valves, which only permit more gas to enter the second filter and the receiver when the pressure of gas in those vessels is less than a prearranged limit.

What we claim is—

The combination, with a filter for acetylene gas, of a perforated vessel I' inside the filter, a perforated vessel $i$ inside the vessel I', absorbent cotton in the vessel $i$, charcoal between the vessels I' and $i$, a gas-pipe leading out of the vessel $i$, a gas-pipe J leading into the filter, and an automatic valve connected to the said filter and regulating the admission of gas through the pipe J, substantially as set forth.

In testimony whereof we affix our signatures in presence of two witnesses.

JOHN FLOOD.
JOSEPH KIPLING.

Witnesses:
A. DE COURCY,
G. GINGRAS.